(12) United States Patent
Elgressy

(10) Patent No.: US 7,638,031 B2
(45) Date of Patent: Dec. 29, 2009

(54) DEPRESSING PRECIPITATION OF SPARINGLY SOLUBLE SALTS IN A WATER SUPPLY

(75) Inventor: Gabi Elgressy, Kiryat Ono (IL)

(73) Assignee: Elgressy Engineering Services Ltd., Netanya (IL)

( * ) Notice: Subject to any disclaimer, the term of this patent is extended or adjusted under 35 U.S.C. 154(b) by 965 days.

(21) Appl. No.: 11/304,745

(22) Filed: Dec. 16, 2005

(65) Prior Publication Data

US 2007/0138104 A1  Jun. 21, 2007

(51) Int. Cl.
*C02F 1/461* (2006.01)
(52) U.S. Cl. .................. 205/725; 204/228.3; 204/228.6; 205/743
(58) Field of Classification Search ......... 205/724–760; 204/228.3, 228.6
See application file for complete search history.

(56) References Cited

U.S. PATENT DOCUMENTS 4,529,572 A  7/1985 Romberger et al.
4,789,448 A  12/1988 Woodhouse
5,695,644 A * 12/1997 Buchanan et al. ........... 210/696
5,837,134 A  11/1998 Heskett

FOREIGN PATENT DOCUMENTS

JP  01299700  12/1989
WO  WO/0249960  6/2002

* cited by examiner

*Primary Examiner*—Arun S Phasge
(74) *Attorney, Agent, or Firm*—Mark M. Friedman

(57) ABSTRACT

A method and device for protecting an aqueous system from scale precipitation by depressing scale precipitation in a bulk phase of a water supply, the device including: (a) an electrolytic cell for fluidly connecting to the system, including: (i) a tank for receiving the water supply, the tank having a copper surface forming a cathode of the cell; and (ii) an element having a zinc surface disposed within the tank, and forming an anode of the cell; (b) a controlling unit for controlling a current (I) from the power supply; and (c) a flowmeter for measuring a flow rate of the water supply, the flow rate associated with a flow rate of water into the system, wherein the controlling unit is designed to control the current according to the flow rate so as to depress the scale precipitation in the bulk phase of the water supply, and wherein the current I exceeds $(1.84-A)*Q$ and is less than $(1.84+A)*Q$, wherein I is measured in amperes; Q is the total flow rate ($m^3/h$); and A is a positive number and less than 1.05.

20 Claims, 1 Drawing Sheet

DEPRESSING PRECIPITATION OF SPARINGLY SOLUBLE SALTS IN A WATER SUPPLY

FIELD AND BACKGROUND OF THE INVENTION

The present invention relates to the depression of precipitation of sparingly soluble salts, such as calcium carbonate, on contact-surfaces and in the bulk phase of industrial and domestic water systems.

It is known that in domestic water systems and in many aqueous industrial processes, sparingly soluble salts, and particularly salts having inverted solubility, such as calcium carbonate ($CaCO_3$), are readily precipitated on contact-surfaces of piping and equipment. Scale formation is a particular problem in heat exchangers and cooling towers, where scale precipitation reduces heat-transfer efficiency, raises energy cost, and decreases the flow-rate and capacity of the system.

There are many techniques used for preventing scale. One widely used technique consists of adding trace concentrations of chemicals capable of decreasing the scale precipitation phenomenon.

Most of the presently used chemicals are polymeric materials like polyphosphates, phosphonates and polyacrylates, usually in the presence of minute amounts of metal ion impurities, such as $Fe^{+2}$, $Mg^{+2}$, $Cu^{+2}$ and $Zn^{+2}$. Many of these additives promote formation of non-adhering aragonite crystals, rather than the usual, adherent calcite morphology. It has been found that zinc ions are particularly effective in decreasing the adherence of calcium carbonate on contact-surfaces.

The following references exemplify these prior-art techniques. U.S. Pat. No. 4,529,572 to Baumberger et al. teaches the use of a zinc complex of an 80:20 acrylic acid-ethylacrylate copolymer for scale prevention in re-circulating water systems. Japanese Patent 01299700 to Ito describes a method using water-soluble organic phosphonates, water-soluble zinc or molybdate salts; and water-soluble copolymers of methacrylic acid and N-substituted methacrylamide. WO 2002049960 to Mueller discloses tripolyphosphates including cations such as, $NH_4$, Li, Na, K, Mg, Sr, Mn, Zn, and Ti, for use as scale inhibitors.

It should be noted that these techniques require chemical dosage pumping devices to provide the desired quantities of scale-inhibiting compounds. Moreover, these techniques often require complicated, online, continuous feedback controlling systems.

In a markedly different approach, the introduction of zinc ions has been achieved using electrochemical reduction-oxidation reactions. Thus, U.S. Pat. No. 5,837,134 to Heskett, teaches the use of particles of a copper-zinc alloy for preventing scale on contact surfaces in water. The zinc and copper in the alloy form a galvanic cell, thereby liberating zinc ions in the water.

One of the disadvantages of the art taught by Heskett is that the surface area of the copper-zinc alloy particles changes as a function of time. Consequently, the concentration of zinc ions in the water is not constant and is largely uncontrolled. Perhaps more significantly, the concentration of zinc ions can increase to undesirable levels when the flow rate of water is low or when the flow is closed for long durations.

It should also be mentioned that excessive concentrations of zinc ions liberated into aqueous systems may precipitate $ZnCO_3$, or $Zn(OH)_2$, and form colloidal masses that require a filtration system.

It is known that water quality influences the precipitation of sparingly soluble salts, in general, and of $CaCO_3$, in particular, on the contact-surfaces of water systems. The rate of formation of scale layers significantly increases as supersaturation of these salts exceeds a certain critical level. One effective way of expressing the supersaturation level of $CaCO_3$ is the Langelier Saturation Index (LSI). The LSI is an equilibrium model derived from the theoretical concept of saturation that provides an indicator of the degree of saturation of water with respect to calcium carbonate. The LSI approximates the base 10 logarithm of the calcite saturation level. The Langelier saturation level approaches the concept of saturation using pH as a main variable. The LSI can be interpreted as the pH change required to bring water to saturation with respect to calcium carbonate.

Thus, water with a LSI of 1.0 is one pH unit above saturation, hence, reducing the pH by 1 unit will bring the water to saturation. This occurs because the portion of total alkalinity present as $CO_3^{2-}$ decreases as the pH decreases, according to the equilibria describing the dissociation of carbonic acid:

$$H_2CO_3 \leftrightharpoons HCO_3^- + H^+$$

$$HCO_3^- \leftrightharpoons CO_3^{2-} + H^+$$

When the LSI is negative, there is no potential to scale and the water will dissolve $CaCO_3$; when the LSI is positive, scale can form and $CaCO_3$ precipitation may occur; and when LSI is close to zero, the water is close to the saturation point, such that a slight change in water quality or changes in temperature, or evaporation could result in precipitation.

It must be noted that the LSI is purely an equilibrium index and deals only with the thermodynamic driving force for calcium carbonate scale precipitation and growth, in terms of pH as a master variable. The LSI provides no indication of how much scale or calcium carbonate will actually precipitate or dissolve as equilibrium is approached.

In order to calculate the LSI, it is necessary to know the alkalinity (milligrams per liter as $CaCO_3$), calcium hardness (milligrams per liter $Ca^{2+}$ as $CaCO_3$), total dissolved solids (TDS) (milligrams per liter TDS), actual pH, and the temperature of the water (° C.). Over the usual pH range of natural waters, the LSI is given by the following expression:

$$LSI = pH - pH_s$$

wherein pH is the measured pH of the water, and $pH_s$ is the pH at saturation in calcite or calcium carbonate and is defined as:

$$pH_s = (9.3 + A + B) - (C + D)$$

wherein:

$$A = (Log_{10}[TDS] - 1)/10,$$

$$B = -13.12 * Log_{10}(°C. + 273) + 34.55,$$

$$C = Log_{10}[Ca^{2+} \text{ as } CaCO_3] - 0.4, \text{ and}$$

$$D = Log_{10}[\text{alkalinity as } CaCO_3].$$

It would be advantageous to have a water treatment method and device that is adaptive to the LSI, or that is largely insensitive to changes therein.

It must be emphasized that while U.S. Pat. No. 5,837,134 to Heskett explicitly refers to scale reduction, the technique taught by Heskett achieves the reduction of scale on contact surfaces by deliberate precipitation of the scale, as Heskett himself articulates:

. . . it is believed that the zinc component of the brass enters into the crystal growth of the scale weakening it and causing it to disintegrate and fail so that the scale is flushed out with the hot water.

(column 4 lines 56-59)

U.S. Pat. No. 4,789,448 to Woodhouse discloses a device for preventing downstream scale formation by an inline configuration that includes a zinc anode and a copper cathode externally connected to an electrical circuit. This device releases charged ions into the water so as to form heterogeneous nucleation sites for crystallization of suspended impurities in the water. Consequently, precipitation on the contact-surfaces of vessels and pipes is diminished. U.S. Pat. No. 4,789,448 to Woodhouse explicitly teaches that it is desirable to deliberately precipitate suspended solids in the water by means of the sacrificial zinc anode. The zinc ions and the negatively charged salt particles that are released into the water by the device, form > sites in the water for formation of crystals of scale forming impurities which remain in suspension in the water thereby reducing deposition of scale on the surfaces of vessels, pipes, or the like into or through which the water subsequently flows. (column 1, lines 50-54)

These suspended salts and impurities may block the downstream system and sometimes may require filtration. In any event, the particulate matter remains in the bulk phase, which is particularly disadvantageous in many applications.

There is therefore a recognized need for, and it would be highly advantageous to have, a device for, and a method of, depressing the precipitation of sparingly soluble salts, in general, and of calcium carbonate, in particular, while inhibiting the formation of suspended solids. It would be of particular advantage for such a device and method to be simple and robust, inexpensive, non-toxic, and facile to control and operate.

SUMMARY OF THE INVENTION

The present invention is an electrochemical method and device for inhibiting the precipitation of sparingly soluble salts, and of calcium carbonate ($CaCO_3$), in particular, both on contact-surfaces and in the bulk phase of aqueous systems, using a sacrificial zinc anode.

According to the teachings of the present invention there is provided a device for protecting an aqueous system from scale precipitation on contact-surfaces of the system, and for depressing scale precipitation in a bulk phase of a water supply, including: (a) an electrolytic cell for fluidly connecting to the aqueous system and for electrically connecting to a DC electrical power supply, including: (i) a tank for receiving the water supply, the tank having a copper surface forming a cathode of the electrolytic cell; and (ii) an element having a zinc surface disposed within the tank, the element forming an anode of the electrolytic cell; (b) a controlling unit for controlling a current (I) from the power supply; and (c) a flowmeter for measuring a first flow rate of the water supply, the first flow rate associated with a total flow rate of water into the aqueous system, wherein the controlling unit is designed and configured to control the current according to the first flow rate so as to depress the scale precipitation in the bulk phase of the water supply, and wherein the current I exceeds a value of $(1.84-A)*Q$ and the current I is less than a value of $(1.84+A)*Q$, wherein I is the current, in amperes, Q is the total flow rate, in cubic meters per hour, and A is a positive number having a value less than 1.05.

According to further features in the described preferred embodiments, the first flow rate equals the total flow rate.

According to still further features in the described preferred embodiments, the value of A is less than 0.86.

According to still further features in the described preferred embodiments, the value of A is less than 0.64.

According to still further features in the described preferred embodiments, the tank is a solid copper tank.

According to still further features in the described preferred embodiments, the controlling unit is solely a feed-forward controlling unit.

According to still further features in the described preferred embodiments, the at least one element includes a solid zinc element.

According to another aspect of the present invention there is provided a device for protecting an aqueous system from scale precipitation on contact-surfaces of the system, and for depressing scale precipitation in a bulk phase of a water supply, the device including: (a) an electrolytic cell for fluidly connecting to the aqueous system and for electrically connecting to a DC electrical power supply, the cell including: (i) a tank for receiving the water supply, the tank having a copper surface forming a cathode of the electrolytic cell; and (ii) at least one element having a zinc surface disposed within the tank, the element forming an anode of the electrolytic cell; and (b) a controlling unit for controlling a current from the power supply, wherein the controlling unit is designed and configured to control the current such that a concentration of zinc ions in the aqueous system is maintained within a narrow range of between 1 and 3.5 milligrams per liter.

According to further features in the described preferred embodiments, the range is between 1.2 and 3.3 milligrams per liter.

According to still further features in the described preferred embodiments, the range is between 1.5 and 3 milligrams per liter.

According to still further features in the described preferred embodiments, the controlling unit is designed and configured to provide a feed-forward control.

According to still further features in the described preferred embodiments, the controlling unit is solely a feed-forward controlling unit.

According to still further features in the described preferred embodiments, the device further includes: (c) a flowmeter for measuring a flowrate associated with the water supply, wherein the controlling unit is designed and configured to control the current according to the flowrate.

According to another aspect of the present invention there is provided a method for protecting an aqueous system from scale precipitation on contact-surfaces of the system, and for depressing scale precipitation in a bulk phase of a water supply, the method including the steps of: (a) providing an electrolytic cell for fluidly connecting to the aqueous system and for electrically connecting to a DC electrical power supply, the cell including: (i) a tank for receiving the water supply, the tank having a copper surface forming a cathode of the electrolytic cell; and (ii) at least one element having a zinc surface disposed within the tank, the element forming an anode of the electrolytic cell; (b) providing a controlling unit for controlling a current from the power supply, and (c) controlling the current, using the controlling unit, so as to maintain a concentration of zinc ions in the water supply to the aqueous system within a narrow range of between 1 and 3.5 milligrams per liter, so as to depress the scale precipitation in the bulk phase of the water supply.

According to further features in the described preferred embodiments, the method further includes the step of: (d)

providing a flowmeter for measuring a flow rate of the water supply, the controlling of the current being responsive to the flowmeter.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawing.

DESCRIPTION OF THE PREFERRED EMBODIMENTS

Figure 1:
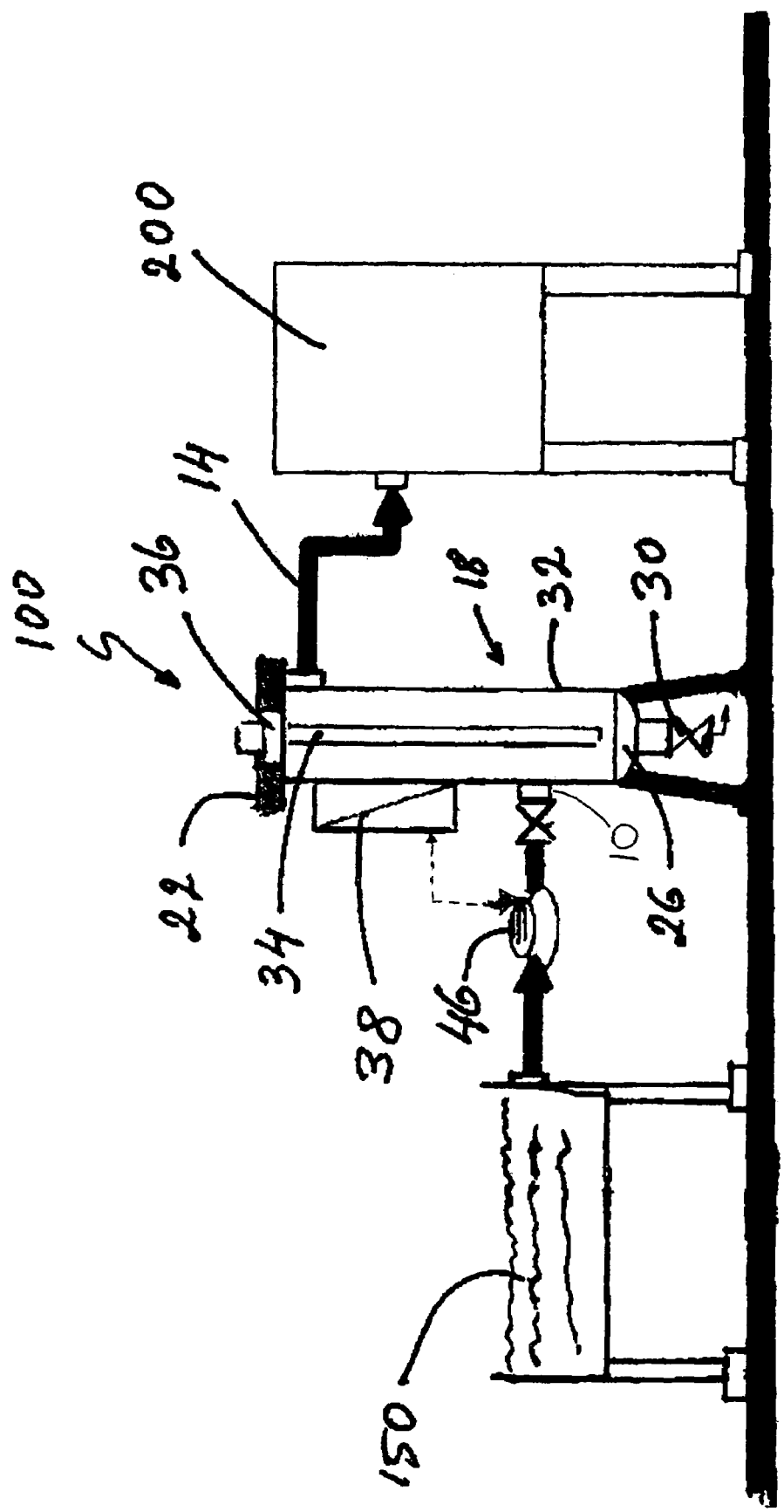
FIG. 1 is a schematic side view of the precipitation-depressing electrochemical device of the present invention.

The present invention is an electrochemical method and device for inhibiting the precipitation of sparingly soluble salts, and of calcium carbonate ($CaCO_3$), in particular, both on contact-surfaces and in the bulk phase of aqueous systems, using a sacrificial zinc anode.

The principles and operation of the method and device according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

The inventive method and device sharply contrast with the prior art of Heskett and Woodhouse. Heskett explicitly teaches the deliberate precipitation of scale using zinc ions. Woodhouse discloses a heterogeneous nucleation process for deliberately precipitating, by means of a sacrificial zinc anode that liberates an exceptionally low concentration of zinc ions in water, extremely fine scale particles.

The inventive device and method overcome the disadvantages of the prior art by:

1. depressing the precipitation of scale on contact surfaces and in the bulk phase, by maintaining the zinc ions concentration within a narrow range of 1 to 3.5 milligrams per liter, preferably 1.2 to 3.3 milligrams per liter, and more preferably 1.5 to 3 milligrams per liter; and 2. controlling the zinc ions concentration within this narrow range. Surprisingly, the inventor has discovered that within these narrow ranges of zinc concentration, precipitation of the sparingly-soluble salts is depressed even in the bulk phase.

Without wishing to be limited by theory, the inventor attributes this desirable behavior to the broadening of the meta-stable zone of the calcium carbonate solubility curve within this narrow range of zinc concentrations. Consequently, heating of the water feed and/or moderate evaporation can be effected without precipitating calcium carbonate.

Thus, by controlling the concentration of zinc ions within this narrow range, a clean bulk phase of water can be maintained, without producing the disadvantageous suspensions of particulate debris that compromise the water quality of the devices and methods of the prior art.

Moreover, the inventive device and method obviate the need for online feedback means for controlling the concentration of zinc ions (e.g., using analytical or electronic measurements), which can be expensive and prone to failure.

It has further been discovered that the electrical current delivered by the inventive device is advantageously (feedforward) controlled based on the flowrate of water into the aqueous system and maintained within the range:

$$I=(1.84+A)*Q \text{ and } I=(1.84-A)*Q$$

wherein: I is the electrical current, in amperes, Q is the flow rate in cubic meter per hour, and A is a positive number having a value less than 1.05. Using this control parameter, the concentration of zinc ions can be kept in the desired narrow concentration range of 1 to 3.5 milligrams per liter. When A is less than 0.86, a more preferable range of 1.2 to 3.3 milligrams per liter is achieved, and when A is less than 0.64, the most preferable range of 1.5 to 3 milligrams per liter of zinc ions is attained.

The water treatment method and device of the present invention has been found to be largely insensitive LSI, within a relatively broad range of LSI and water-hardness values. Moreover, the above-described feed-forward control method is precise and robust, and obviates the need for various feedback control loops.

Referring now to the drawing, FIG. 1 is a schematic side view of the electrochemical device 100 of the present invention. Electrochemical device 100 is installed upstream of a water system 200 requiring protection from scale. System 200 may be a domestic system requiring scale protection of the piping and equipment, in particular heated equipment such as laundry machines, dishwashers and other warm water appliances, or an industrial facility such as cooling towers, steam boilers, heating systems, or reactors and equipment containing aqueous solutions prone to scaling.

Device 100 consists of a tank 18 for receiving a water supply from a water source 150 such as a reservoir, local water main, etc. Tank 18 is typically cylindrical, and is fashioned with a cover 22 and a sloped tank bottom 26. Tank 18 is made of, covered with, clad or coated with, copper, or includes at least one copper element 32 having a surface. Copper element 32 is electrically connected to a DC power supply (not shown), so as to form a cathode of an electrical cell. At least one zinc element 34 having a surface, made of, covered with, clad or coated with zinc, is connected to the electrical DC power supply, so as to form an anode of the electrical cell. Zinc element 34, typically rod-shaped, is physically attached to cover 22, but is electrically insulated from tank 18 by an insulation element 36.

Feedwater is introduced into device 100 through a water-inlet 10 advantageously installed just above tank bottom 26, thereby allowing any debris from the feedwater to settle in tank bottom 26. A water-outlet 14 from tank 18, for feeding an aqueous system 200, is disposed in proximity to cover 22, so as to ensure that tank 18 is always full with water. Tank 18 is preferably equipped with a drain valve 30, connected to tank bottom 26, for enabling flushing of tank 18, as necessary.

A controlling unit 38 (e.g., any of various commercially-available instruments providing electrical current according to a preset scheme), which is electrically associated with tank 18, may be electrical, electronic, or most preferably, a programmable logic controller (PLC) designed to control the DC current according to the flowrate as measured by a flowmeter 46 associated with water-inlet 10. Controlling unit 38 is responsive to changes in flowrate measured by flowmeter 46, so as to control the current delivered to the electrolytic cell within the range of $I=(1.84-A)*Q$ and $I=(1.84+A)*Q$, as described in greater detail hereinabove.

Maintaining the current within this range assures that the concentration of zinc ions is kept in the desired narrow range described in detail hereinabove.

It will be recognized by those skilled in the art that the above-mentioned DC power supply may be external to electrochemical device 100, or alternatively, the conversion from AC current to DC current may be effected by a component of controlling unit 38.

Inventive device 100 is simple, effective, inexpensive, and easy to install, operate, control and maintain. Within limits, device 100 is controlled so as to depress the precipitation of sparingly soluble salts, even in the bulk phase, thereby avoiding the production of heavy sludges containing amphoteric zinc oxide, zinc hydroxide, and/or zinc carbonate, which remain in suspension, compromise water quality, and may plug the system. Electrochemical device 100 is also controlled to maintain the zinc concentration well under the maximum level allowed by the FDA.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A device for protecting an aqueous system from scale precipitation on contact-surfaces of the system, and for depressing scale precipitation in a bulk phase of a water supply, the device comprising:
    (a) an electrolytic cell for fluidly connecting to the aqueous system and for electrically connecting to a DC electrical power supply, said cell including:
        (i) a tank for receiving the water supply, said tank having a copper surface forming a cathode of said electrolytic cell; and
        (ii) at least one element having a zinc surface disposed within said tank, said element forming an anode of said electrolytic cell;
    (b) a controlling unit for controlling a current (I) from said power supply; and
    (c) a flowmeter for measuring a first flow rate of the water supply, said first flow rate associated with a total flow rate of water into the aqueous system, wherein said controlling unit is designed and configured to control said current according to said first flow rate so as to depress the scale precipitation in the bulk phase of the water supply, and wherein said current I exceeds a value of $(1.84-A)*Q$ and said current I is less than a value of $(1.84+A)*Q$, wherein:

I is said current, in amperes;
Q is said total flow rate, in cubic meters per hour; and
A is a positive number having a value less than 1.05.

2. The device of claim 1, wherein said first flow rate equals said total flow rate.

3. The device of claim 1, wherein said value of A is less than 0.86.

4. The device of claim 1, wherein said value of A is less than 0.64.

5. The device of claim 1, wherein said tank is a solid copper tank.

6. The device of claim 1, wherein said controlling unit is solely a feed-forward controlling unit.

7. The device of claim 1, wherein said at least one element includes a solid zinc element.

8. A device for protecting an aqueous system from scale precipitation on contact-surfaces of the system, and for depressing scale precipitation in a bulk phase of a water supply, the device comprising:
    (a) an electrolytic cell for fluidly connecting to the aqueous system and for electrically connecting to a DC electrical power supply, said cell including:
        (i) a tank for receiving the water supply, said tank having a copper surface forming a cathode of said electrolytic cell; and
        (ii) at least one element having a zinc surface disposed within said tank, said element forming an anode of said electrolytic cell; and
    (b) a controlling unit for controlling a current from said power supply, wherein said controlling unit is designed and configured to control said current such that a concentration of zinc ions in the aqueous system is maintained within a narrow range of between 1 and 3.5 milligrams per liter.

9. The device of claim 8, wherein said range is between 1.2 and 3.3 milligrams per liter.

10. The device of claim 8, wherein said range is between 1.5 and 3 milligrams per liter.

11. The device of claim 8, wherein said controlling unit is designed and configured to provide a feed-forward control.

12. The device of claim 8, wherein said controlling unit is solely a feed-forward controlling unit.

13. The device of claim 8, wherein said at least one element includes a solid zinc element.

14. The device of claim 8, further comprising:
    (c) a flowmeter for measuring a flowrate associated with the water supply, wherein said controlling unit is designed and configured to control said current according to said flowrate.

15. The device of claim 14, wherein said controlling unit is designed and configured to provide a feed-forward control.

16. A method for protecting an aqueous system from scale precipitation on contact-surfaces of the system, and for depressing scale precipitation in a bulk phase of a water supply, the method comprising the steps of:
    (a) providing an electrolytic cell for fluidly connecting to the aqueous system and for electrically connecting to a DC electrical power supply, said cell including:
        (i) a tank for receiving the water supply, said tank having a copper surface forming a cathode of said electrolytic cell; and
        (ii) at least one element having a zinc surface disposed within said tank, said element forming an anode of said electrolytic cell;
    (b) providing a controlling unit for controlling a current from said power supply, and
    (c) controlling said current, using said controlling unit, so as to maintain a concentration of zinc ions in the water supply to the aqueous system within a narrow range of between 1 and 3.5 milligrams per liter, so as to depress the scale precipitation in the bulk phase of the water supply.

17. The method of claim 16, further comprising the step of:
(d) providing a flowmeter for measuring a flow rate of the water supply, and wherein said controlling of said current is responsive to said flowmeter.

18. The method of claim 17, wherein said controlling of said current includes a feed-forward control.

19. The method of claim 17, wherein said controlling of said current consists solely of a feed-forward control.

20. The method of claim 17, wherein said wherein said narrow range is between 1.5 and 3 milligrams per liter.

* * * * *